United States Patent [19]

Yahagi

[11] Patent Number: 5,428,817
[45] Date of Patent: Jun. 27, 1995

[54] MOBILE COMMUNICATION SYSTEM HAVING VARIABLE COVERAGE AREAS

[75] Inventor: Masahiko Yahagi, Tokyo, Japan

[73] Assignee: NEC Corporation, Tokyo, Japan

[21] Appl. No.: 73,073

[22] Filed: Jun. 8, 1993

[30] Foreign Application Priority Data

Jun. 9, 1992 [JP] Japan ................. 4-149037

[51] Int. Cl.⁶ ............................................. H04Q 7/36
[52] U.S. Cl. ........................ 455/33.3; 455/33.1;
455/54.2; 455/56.1; 455/67.1; 455/129; 379/59
[58] Field of Search ................ 455/33.1, 33.2, 33.3,
455/33.4, 54.1, 54.2, 56.1, 67.1, 103, 129;
379/59; 359/145, 147

[56] References Cited

U.S. PATENT DOCUMENTS

| | | | |
|---|---|---|---|
| 4,144,411 | 3/1979 | Frenkiel | 455/33.3 |
| 4,759,051 | 7/1988 | Han | 455/33.3 |
| 5,021,801 | 6/1991 | Smith et al. | 343/876 |

FOREIGN PATENT DOCUMENTS 3441722 5/1986 Germany ................ 455/33.2

OTHER PUBLICATIONS

Darcie et al., "Wide-Band Lightwave Distribution System Using Subcarrier Multiplexing," *Journal of Lightwave Technology*, vol. 7, No. 6, pp. 997-1005 (Jun. 1989).
Midwinter et al., "Photonics in Switching: The Next 25 Years of Optical Communications?", *IEE Proceedings-J*, vol. 139, No. 1, pp. 1-13 (Feb. 1992).

Primary Examiner—Edward F. Urban
Assistant Examiner—Doris To
Attorney, Agent, or Firm—Foley & Lardner

[57] ABSTRACT

In a mobile communication system where a service area is divided into a plurality of coverage areas defined by a plurality of mobile base stations, at least one of the shape and size of the coverage areas is changed in accordance with a number of mobile stations being serviced within each of the coverage areas, so that such a number of mobile stations is brought within a predetermined range.

9 Claims, 20 Drawing Sheets

| COVERAGE AREA | M (i) | |
|---|---|---|
| | BEFORE MOD | AFTER MOD |
| A | −6 | −5 |
| B | +10 | +8 |
| C | 0 | +1 |
| D | 0 | −4 |

Fig. 16

| ANTENNA | BEFORE ADJUSTMENT | | AFTER ADJUSTMENT | | COMMAND | |
|---|---|---|---|---|---|---|
| | COVERAGE AREA | LINK NO. | COVERAGE AREA | LINK NO. | OFF COMMAND | ON COMMAND |
| E 1 | A | 1 | A | 1 | | |
| E 2 | A | 2 | A | 2 | | |
| E 3 | A | 3 | B | 5 | $S_{3,3}(A,E)$ | $S_{5,3}(B,E)$ |
| E 4 | B | 1 | B | 1 | | |
| E 5 | B | 2 | B | 2 | | |
| F 1 | A | 4 | A | 4 | | |
| F 2 | A | 5 | A | 5 | | |
| F 3 | A | 6 | B | 6 | $S_{6,3}(A,F)$ | $S_{6,3}(B,F)$ |
| F 4 | B | 3 | B | 3 | | |
| F 5 | B | 4 | B | 4 | | |
| G 1 | A | 7 | C | 4 | $S_{7,1}(A,G)$ | $S_{4,1}(C,G)$ |
| G 2 | A | 8 | C | 5 | $S_{8,2}(A,G)$ | $S_{5,2}(C,G)$ |
| G 3 | A | 9 | B | 7 | $S_{9,3}(A,G)$ | $S_{7,3}(B,G)$ |
| G 4 | D | 1 | B | 8 | $S_{1,4}(D,G)$ | $S_{8,4}(B,G)$ |
| G 5 | D | 2 | B | 9 | $S_{2,5}(D,G)$ | $S_{9,5}(B,G)$ |
| H 1 | C | 1 | C | 1 | | |
| H 2 | C | 2 | C | 2 | | |
| H 3 | C | 3 | B | 10 | $S_{3,3}(C,H)$ | $S_{10,3}(B,H)$ |
| H 4 | D | 3 | B | 11 | $S_{3,4}(D,H)$ | $S_{11,4}(B,H)$ |
| H 5 | D | 4 | B | 12 | $S_{4,5}(D,H)$ | $S_{12,5}(B,H)$ |

| COVERAGE AREA | A | B | C | D |
|---|---|---|---|---|
| N (i) | 6 | 4 | 6 | 4 |
| E (i) | 150.0 | 50.0 | 150.0 | 50.0 |

Fig. 21A

BEFORE ADJUSTMENT

| ANTENNA | COVERAGE AREA | LINK NO. | $E_a$ A | B | C | D |
|---|---|---|---|---|---|---|
| E 1 | A | 1 | 25.0 | | | |
| E 2 | A | 2 | 25.0 | | | |
| E 3 | A | 3 | 25.0 | | | |
| E 4 | B | 1 | | 12.5 | | |
| E 5 | B | 2 | | 12.5 | | |
| F 1 | A | 4 | 25.0 | | | |
| F 2 | A | 5 | 25.0 | | | |
| F 3 | A | 6 | 25.0 | | | |
| F 4 | B | 3 | | 12.5 | | |
| F 5 | B | 4 | | 12.5 | | |
| G 1 | C | 1 | | | 25.0 | |
| G 2 | C | 2 | | | 25.0 | |
| G 3 | C | 3 | | | 25.0 | |
| G 4 | D | 1 | | | | 12.5 |
| G 5 | D | 2 | | | | 12.5 |
| H 1 | C | 4 | | | 25.0 | |
| H 2 | C | 5 | | | 25.0 | |
| H 3 | C | 6 | | | 25.0 | |
| H 4 | D | 3 | | | | 12.5 |
| H 5 | D | 4 | | | | 12.5 |
| | E(i) | | 150.0 | 50.0 | 150.0 | 50.0 |

Fig. 21B

| A | A | A | B | B |
|---|---|---|---|---|
| A | A | A | B | B |
| C | C | C | D | D |
| C | C | C | D | D |

Fig. 22B

| A | A | B | B | B |
|---|---|---|---|---|
| A | A | B | B | B |
| C | C | D | D | D |
| C | C | D | D | D |

Fig. 22A

AFTER ADJUSTMENT

| ANTTENA | COVERAGE AREA | LINK NO. | $E_a$ A | B | C | D |
|---|---|---|---|---|---|---|
| E 1 | A | 1 | 25.0 | | | |
| E 2 | A | 2 | 25.0 | | | |
| E 3 | B | 5 | | 25.0 | | |
| E 4 | B | 1 | | 12.5 | | |
| E 5 | B | 2 | | 12.5 | | |
| F 1 | A | 4 | 25.0 | | | |
| F 2 | A | 5 | 25.0 | | | |
| F 3 | B | 6 | | 25.0 | | |
| F 4 | B | 3 | | 12.5 | | |
| F 5 | B | 4 | | 12.5 | | |
| G 1 | C | 1 | | | 25.0 | |
| G 2 | C | 2 | | | 25.0 | |
| G 3 | D | 5 | | | | 25.0 |
| G 4 | D | 1 | | | | 12.5 |
| G 5 | D | 2 | | | | 12.5 |
| H 1 | C | 4 | | | 25.0 | |
| H 2 | C | 5 | | | 25.0 | |
| H 3 | D | 6 | | | | 25.0 |
| H 4 | D | 3 | | | | 12.5 |
| H 5 | D | 4 | | | | 12.5 |
| E ( i ) | | | 100.0 | 100.0 | 100.0 | 100.0 |

# MOBILE COMMUNICATION SYSTEM HAVING VARIABLE COVERAGE AREAS

BACKGROUND OF THE INVENTION

1. Field of the Invention

The present invention relates to a cellular mobile communication system, and more particularly, to the improvement of coverage areas defined by mobile base stations.

2. Description of the Related Art

A prior art cellular mobile communication system includes a mobile control station and a plurality of mobile base stations. The mobile control station carries out call connection control for public switched telephone networks and call distribution control for the mobile base stations. In this case, a plurality of mobile tranceivers, i.e., antennas are provided at different sites, and each of the antennas is fixedly connected to one of the mobile base stations. That is, a service area defined by the mobile control station is divided into a plurality of coverage areas defined by the mobile stations, i.e., the antennas, which will be later explained in detail.

In the prior art system, however, since a coverage area defined by one of the mobile base stations is dependent upon a single antenna, large blind sections are present, to create a service interruption between the mobile stations and the mobile base station. Also, the distribution of power of waves within each of the coverage areas is not uniform, thus degrading the quality of communications between the mobile control station and the mobile stations.

Also, in the above-mentioned prior art system, the coverage area defined by one of the mobile base stations has been adjusted in consideration of expected distribution and density of mobile stations to service within the coverage area, as follows:

(1) A directional antenna or an omnidirectional antenna is adopted, and the horizontal directivity thereof is changed. Otherwise, downtilting of the antenna is adopted to change the vertical directivity thereof. In this case, however, since a mechanical adjustment is required, it is impossible to follow a rapid change of the distribution and density of mobile stations.

(2) A power control system is adopted to change the power of waves generated from the antenna. In this case, however, when the power of the waves is too strong, an interruption is generated in waves used to service other adjacent coverage areas, while when the power of waves is too weak, unexpected blind sections are generated.

Thus, in the prior art system, since it is difficult to change the shape and size of each of the coverage areas, when the density of mobile stations being serviced becomes rapidly large in one coverage area, a congestion state may be locally generated therein.

SUMMARY OF THE INVENTION

It is an object of the present invention to make the power distribution of waves uniform within each of the coverage areas to thereby improve the quality of communication between the mobile control station and the mobile stations.

Another object of the present invention is to avoid the generation of a local congestion state within each of the coverage areas.

According to the present invention, in a mobile communication system where a service area is divided into a plurality of coverage areas defined by a plurality of mobile base stations, at least one of the shape and size of the coverage areas are changed in accordance with a number of mobile stations being serviced within each of the coverage areas, so that such a number of mobile stations are brought within a predetermined range. As a result, the power of the waves within each of the coverage areas can be made uniform. Also, even when the number of mobile stations being serviced within one coverage area is too large, this coverage area can be divided into smaller coverage areas, to thereby avoid a local congestion state.

BRIEF DESCRIPTION OF THE DRAWINGS

The present invention will be more clearly understood from the description as set forth below, compared with the prior art, with reference to the accompanying drawings, wherein:

FIG. 16 is a diagram showing the connections between the optical signal distributing and mixing system and the optical switching network of FIG. 4;

FIGS. 17A through 17K are diagrams showing a transition example of the coverage areas in the system of FIG. 4.

FIG. 20 is a digram showing the values of N(i) and E(i) in the flowchart of FIGS. 18 and 19;

FIG. 21A is a digram showing the connections between the optical signal distributing and mixing system and the optical switching network of FIG. 4 before an adjustment;

FIG. 21B is a diagram showing the coverage areas defined by the connections as shown in FIG. 21A;

FIG. 22A is a digram showing the connections between the optical signal distributing and mixing system and the optical switching network of FIG. 4 after an adjustment; and FIG. 22B is a diagram showing the coverage areas defined by the connections as shown in FIG. 22A.

DESCRIPTION OF THE PREFERRED EMBODIMENT

Before the description of an embodiment of the present invention, a prior art address translation apparatus will be explained with reference to FIGS. 1, 2 and 3.

Figure 1:
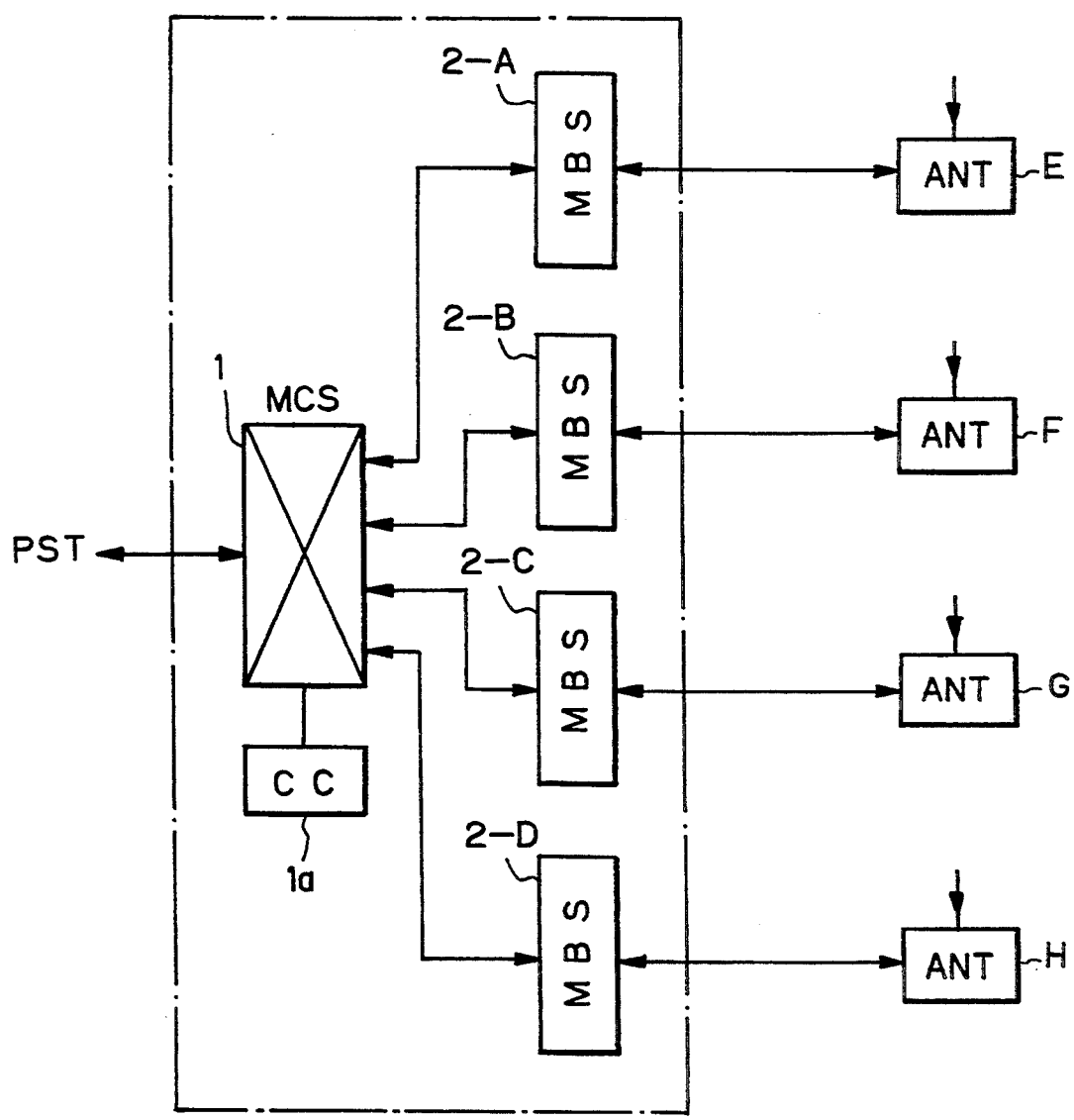
FIG. 1 is a block circuit diagram illustrating a prior art mobile communication system.

In FIG. 1, which illustrates a prior art mobile communication system, reference numeral 1 designates a mobile control station (MCS) including a switching network for carrying out a call connection control for a public switched telephone network (PST) and a call distribution control for mobile base stations (MBS's) 2-A, 2-B, 2-C and 2-D. The mobile control station 1 is associated with a control circuit 1a. The mobile control station 1 with the control circuit 1a and the mobile base stations 2-A, 2-B, 2-C and 2-D are generally installed within one building, as indicated by a dash-dot line.

Each of the mobile base stations 2-A, 2-B, 2-C and 2-D are connected to antenna units E, F, G and H, respectively, which are located at different sites. That is, one of the mobile base station 2-A, 2-B, 2-C and 2-D is fixedly connected to only one of the antenna units E, F, G and H.

Thus, a service area defined by the mobile control station 1 is divided into four coverage areas defined by the mobile base stations 2-A, 2-B, 2-C and 2-D, i.e., the antenna units E, F, G and H.

Figure 2:
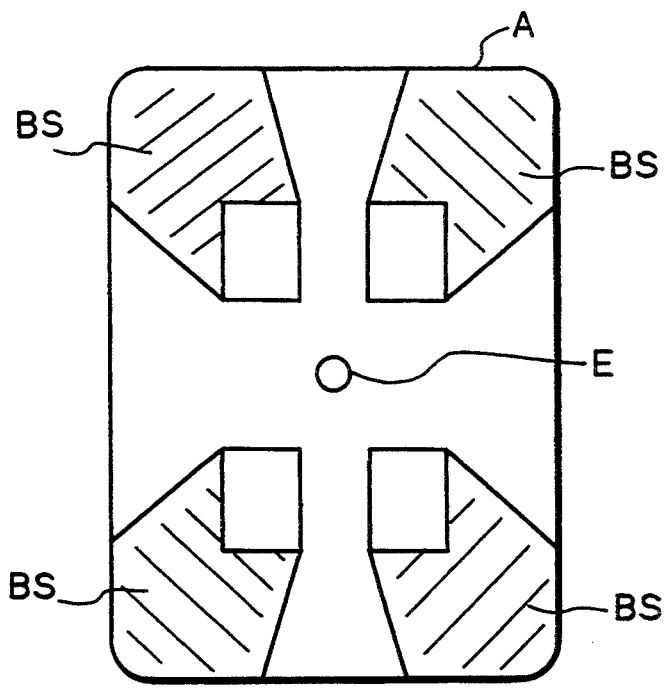
FIG. 2 is a diagram showing a coverage area defined by the system of FIG. 1.

As shown in FIG. 2, if one coverage area A is dependent upon a single antenna unit such as E, large blind sections BS may be generated in the coverage area, to create a service interruption for the mobile stations (not shown) being serviced within the coverage area A. Also, if the power of waves within the coverage area A is not uniform, the quality of communications between the mobile control station 1 and the mobile stations (not shown) being serviced in the coverage area A will be degraded.

Figure 3:
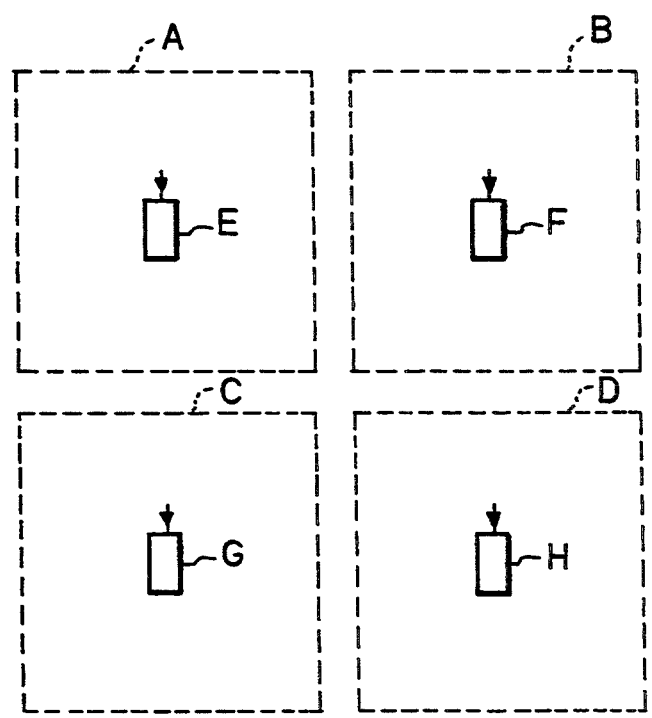
FIG. 3 is a diagram showing a plurality of coverage areas defined by the system of FIG. 1.

Also, as shown in FIG. 3, the shape and size of four coverage areas A, B, C and D defined by the antenna units E, F, G and H are unchanged. Therefore, when the density of mobile stations being service becomes rapidly large in one coverage area such as A, a congestion state may be generated.

Figure 4:
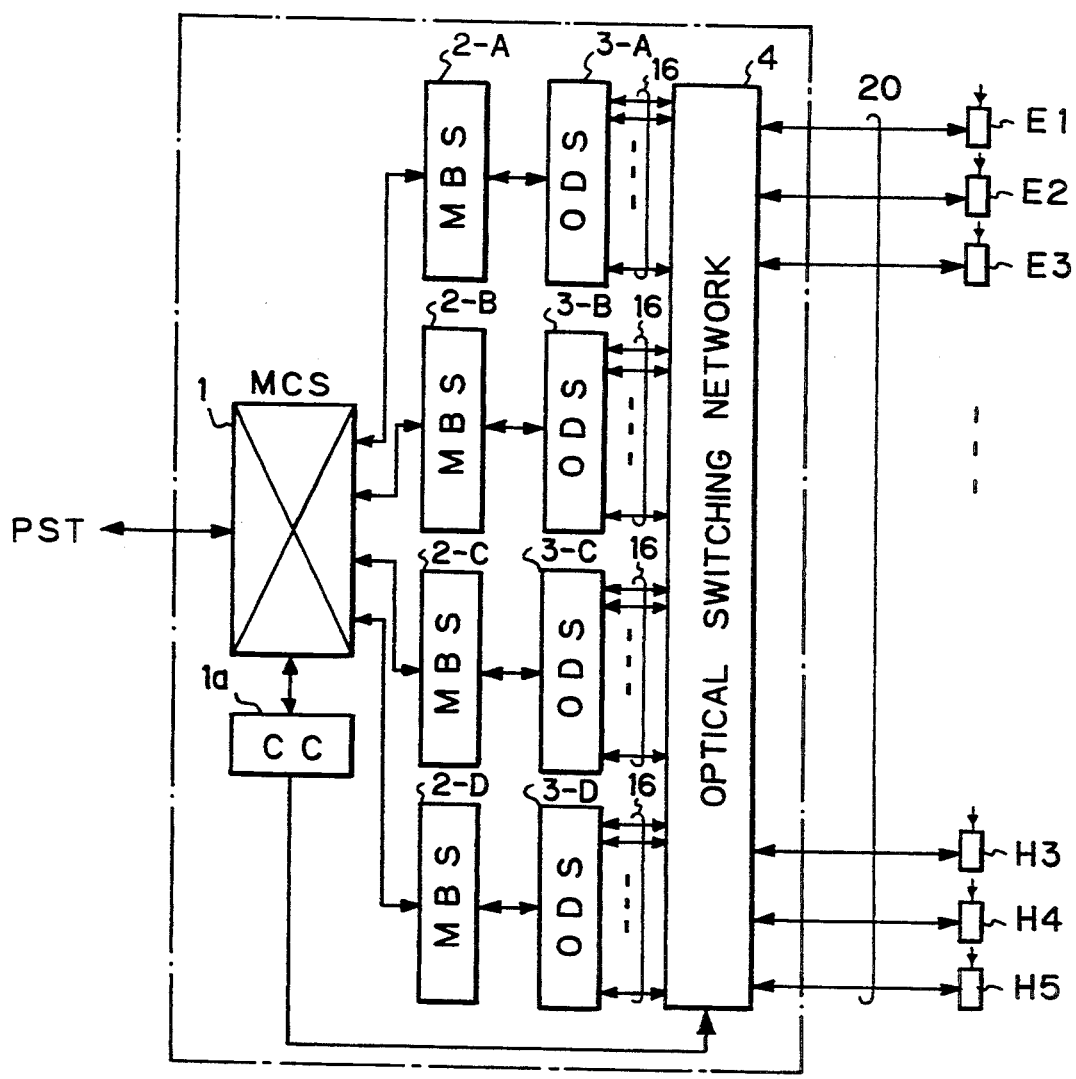
FIG. 4 is a block circuit diagram illustrating an embodiment of the mobile communication system according to the present invention.

In FIG. 4, which illustrates an embodiment of the present invention, optical distributing and mixing systems (ODS) 3-A, 3-B, 3-C and 3-D and an optical switching network 4 are added to the elements of FIG. 1. Also in this case, the mobile control station 1 associated with the control circuit 1a, the mobile base stations 2-A, 2-B, 2-C and 2-D, the optical distributing and mixing systems 3-A, 3-B, 3-C and 3-D and the optical switching network 4 are installed within one building as indicated by a dash-dot line. Also, twenty antenna units E1, E2, E3, E4, E5, F1, F2, F3, F4, F5, G1, G2, G3, G4, G5, H1, H2, H3, H4 and H5 are provided. In this case, the number of the antenna units is larger than that of the mobile base stations.

Each of the optical distributing and mixing systems 3-A, 3-B, 3-C and 3-D distributes one electrical link from one of the mobile base stations 2-A, 2-B, 2-C and 2-D to a plurality of optical links, such as sixteen optical links, to the optical switching network 4. Also, each of the optical distributing and mixing systems 3-A, 3-B, 3-C and 3-D mixes a plurality of optical links, i.e., sixteen optical links, from the optical switching network 4 into one electrical link to the one of the mobile base stations 2-A, 2-B, 2-C and 2-D. That is, the optical distributing and mixing systems 3-A, 3-B, 3-C and 3-D are bidirectional.

The optical switching network 4 selectively connects 64 ($=16\times 4$) optical links from the optical distributing and mixing systems 3-A, 3-B, 3-C and 3-D to the antenna units E1, E2, E3, ..., F13, H4 and H5. This optical switching network 4 may be a simple configuration formed by an array of $64\times 20$ ON/OFF optical switches which, however, invite large insertion losses. In order to reduce such insertion losses, an assembly of smaller block buildings can be adopted, which will be later explained in detail (see: J. E. Midwinter: "Photonics in Switching: the Next 25 Years of Optical communications?", IEE Proceedings-J, Vol. 139, No. 1, February 1992, pp. 1–13). The optical switching network 4 is controlled by commands from the control circuit 1a. Also, the optical switching network 4 is bidirectional.

Due to the presence of the optical distributing/mixing systems 3-A, 3-B, 3-C and 3-D and the optical switching network 4, the number of antenna units connected to one mobile base station can be changed, thereby to change the shape and size of each coverage area.

Figure 5:
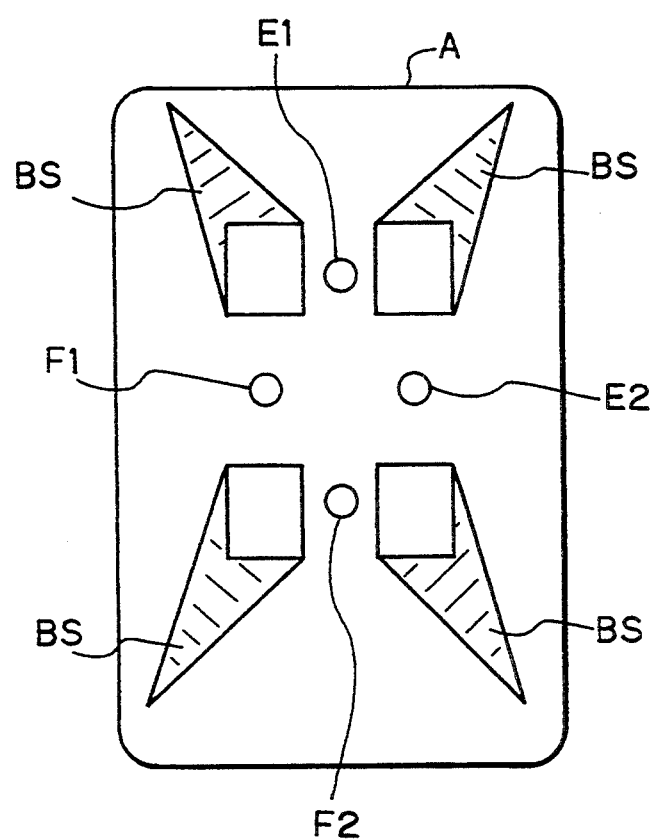
FIG. 5 is a diagram showing a coverage area defined by the system of FIG. 4.

For example, when the mobile base station 2-A is connected to the four antenna units E1, E2, F1 and F2 by the optical distributing and mixing system 3-A and the optical switching network 4, the coverage area A is as shown in FIG. 5. That is, blind sections BS can be smaller compared with the coverage area A as shown in FIG. 2. Thus, there is generated little service interruption for the mobile stations (not shown) being serviced within the coverage area A and the mobile base station 2-A. Also, the power of waves within the coverage area A can be made uniform, thereby improving the quality of communications between the mobile control station 1 and the mobile stations (not shown) being serviced within the coverage area A.

Figure 6A:
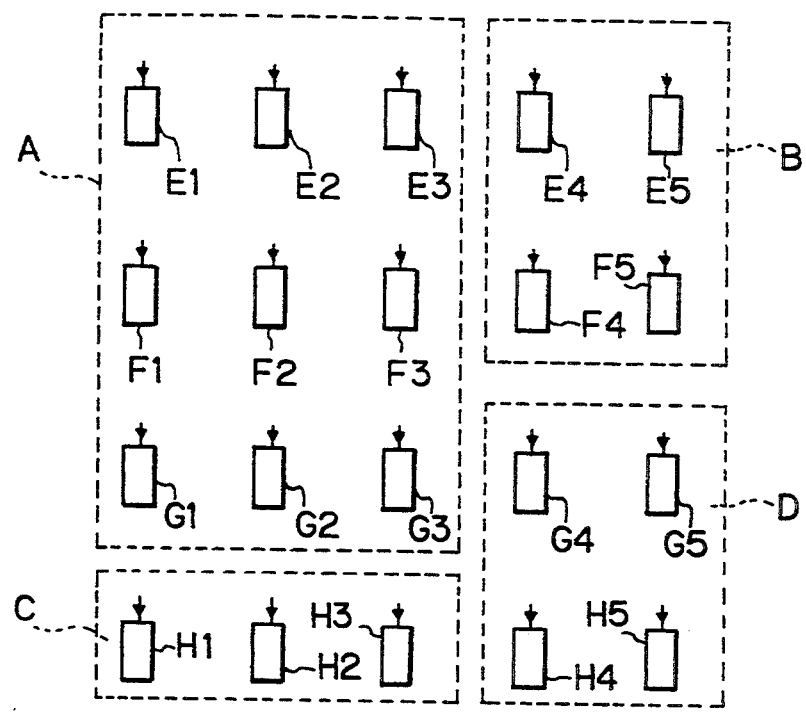
FIGS. 6A and 6B are diagrams showing a plurality of coverage areas defined by the system of FIG. 4.
Figure 6B:
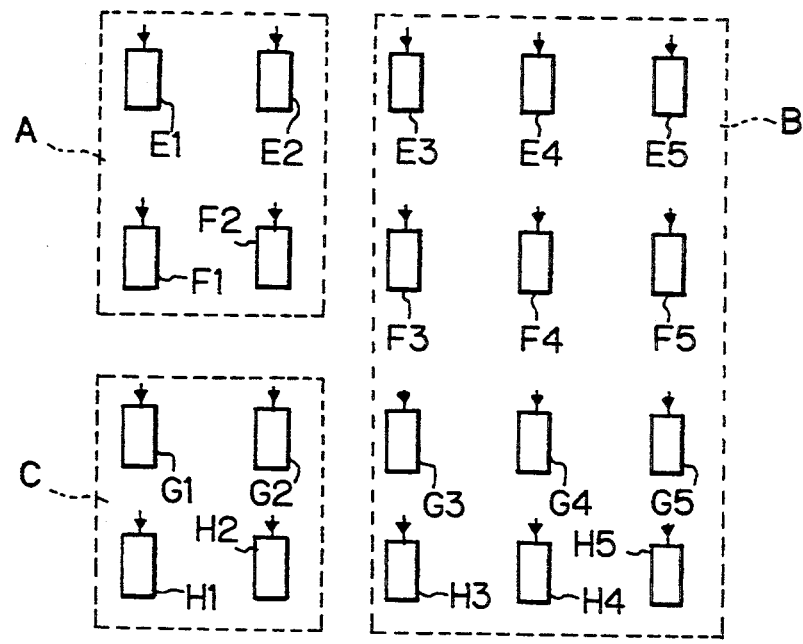

Also, when the density of mobile stations being serviced within one coverage area is changed, the shape and size of this coverage area are changed. For example, as shown in FIG. 6A, the coverage area A is defined by the antenna units E1, E2, E3, F1, F2, F3, G1, G2, and G3; the coverage area B is defined by the antenna units E4, E5, F4 and F5; the coverage area C is defined by the antenna units H1, H2 and H3; and the coverage area D is defined by the antenna units G4, G5, H4 and H5. In this state, when the density of the coverage area A is rapidly increased, the coverage area A is divided into smaller coverage areas; that is, the other coverage areas B and C are enlarged into the coverage area A, as shown in FIG. 6B. Thus, a congestion state in the coverage area A can be avoided.

Figure 7:
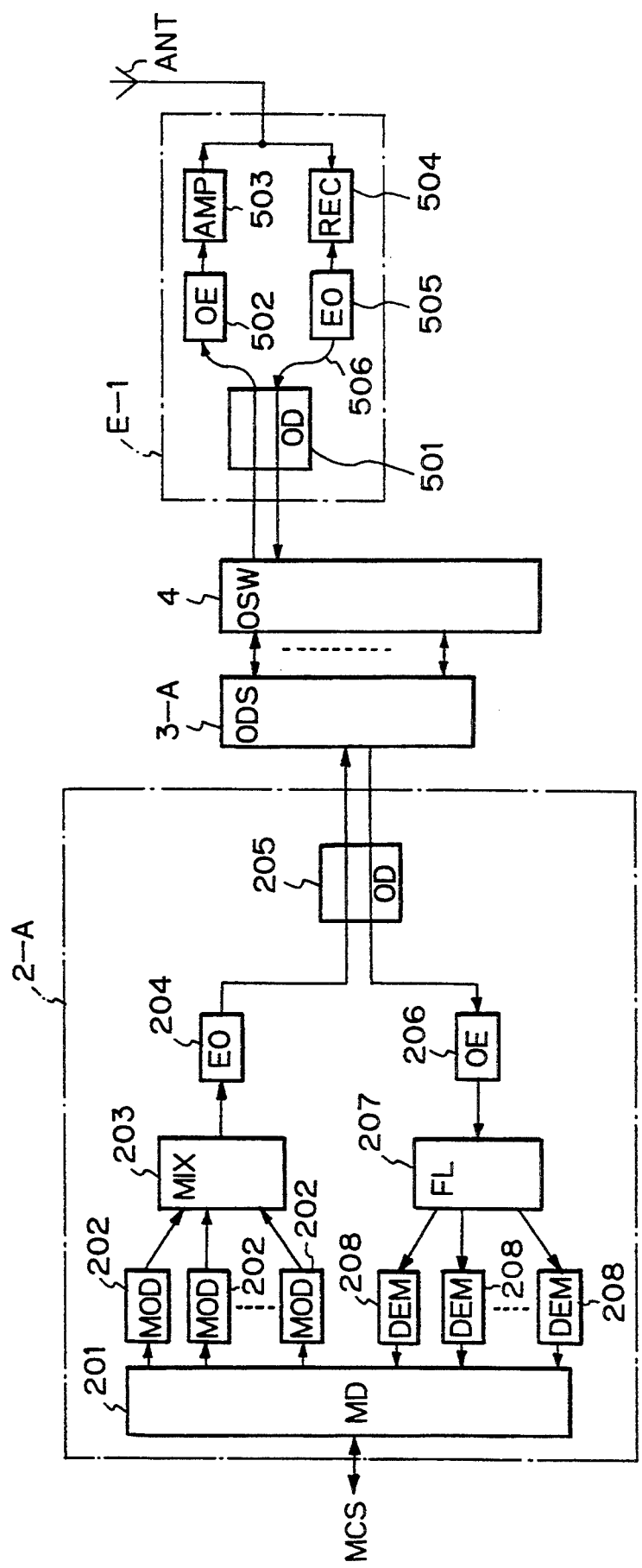
FIG. 7 is a detailed block circuit diagram of the mobile base station and the antenna unit of FIG. 4.

In FIG. 7, which is a detailed block circuit diagram of the mobile base station 2-A and the antenna unit E-1, the mobile base station 2-A includes a mixing and distributing unit (MD) 201 for distributing a signal to modulation (MOD) units 202. The radio frequency (RF) signal outputs of the modulation units 202 are mixed at a mixer (MIX) 203, and the mixed RF signal is converted by an electro/optical (EO) conversion unit 204 into an RF optical signal. The RF optical signal is supplied via an optical distributing unit (OD) 205 to the optical distributing and mixing system 3-A. Similarly, an optical RF signal from the optical distributing and mixing system 3-A is supplied via the optical distributing unit 205 to an opto/electrical (OE) conversion unit 206. The electrical RF signal of the opto/electrical conversion unit 206 is supplied via a band control filter (FL) 207 to demodulation unit (DEM) 208. Then, the RF output signals of the demodulation units 208 are mixed at the electrical mixing and distributing unit 201 and then, the mixed RF signal is supplied to the mobile control station 1.

The antenna unit E-1 includes an optical distribution unit (OD) 501 for receiving an optical RF signal from the optical switching network 4. This optical RF signal is converted by an opto/electrical conversion unit (OE) 502 into an electrical RF signal. The electrical RF signal is amplified by an amplifier 503 and is emitted from an antenna ANT into the air. Similarly, an RF signal generated from the mobile station (not shown) is received by the antenna ANT and is extracted by a receiver (REC) 504 with a band pass filter. The extracted RF signal is converted by an electro/optical (EO) conversion unit 505 into an optical RF signal and is transmitted via the optical distributing unit 501 to the optical switching network 4.

The optical switching network 4 is explained next in detail with reference to FIGS. 8, 9, 10, 11 and 12.

Figure 8:
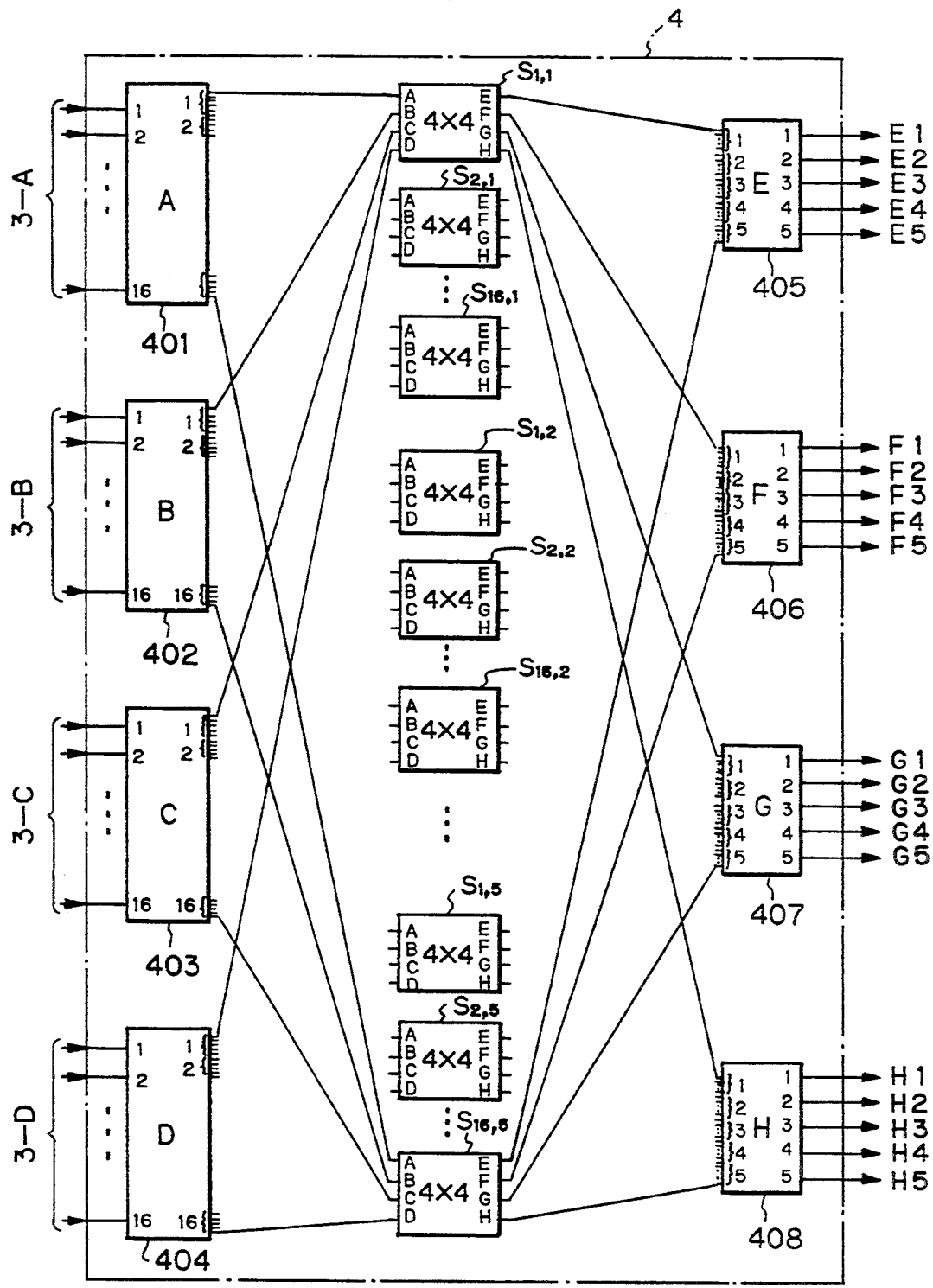
FIG. 8 is a detailed block circuit diagram of the optical switching network of FIG. 4.

In FIG. 8, which is a detailed block circuit diagram of the optical switching network 4, four optical input portions 401, 402, 403 and 404 are provided for receiving optical RF signals from the optical distributing and mixing systems 3-A, 3-B, 3-C and 3-D, respectively, and four optical output portions 405, 406, 407 and 408 are provided for outputting optical RF signals to a group of the antenna units E1, E2, E3 and E4; a group of the antenna units F1, F2, F3 and F4; a group of the antenna units G1, G2, G3 and G4; and a group of the antenna units H1, H2, H3 and H4, respectively. Provided between the optical input portions 401, 402, 403 and 404 and the optical output portions 405, 406, 407 and 408 are eighty 4×4 optical switches $S_{1,1}, S_{2,1}, \ldots, S_{16,1}, S_{1,2}, S_{2,2}, \ldots, S_{16,2}, \ldots, S_{1,5}, S_{2,5}, \ldots, S_{16,5}$. Each of the optical switches $S_{j,k}$ (j=1 to 16, k=1 to 5) has four input ports A, B, C and D optically connected to the optical input portions 401, 402, 403 and 404, respectively, and four output ports E, F, G and H optically connected to the optical output portions 405, 406, 407 and 408, respectively. The input ports A, B, C and D of the optical switches $S_{j,k}$ are optically connected to the j-th link of the optical input portions 401, 402, 403 and 404, respectively, and the output ports E, F, G and H of the optical switches $S_{j,k}$ are optically connected to the k-th link of the optical output portions 405, 406, 407 and 408, respectively. For example, in the optical switch $S_{1,1}$, if the input port A is turned ON and the other input ports B, C and D are turned OFF, and simultaneously, the output port E is turned ON and the other output ports F, G and H are turned OFF, the mobile base 2-A is connected to the antenna unit E1.

Figure 9:
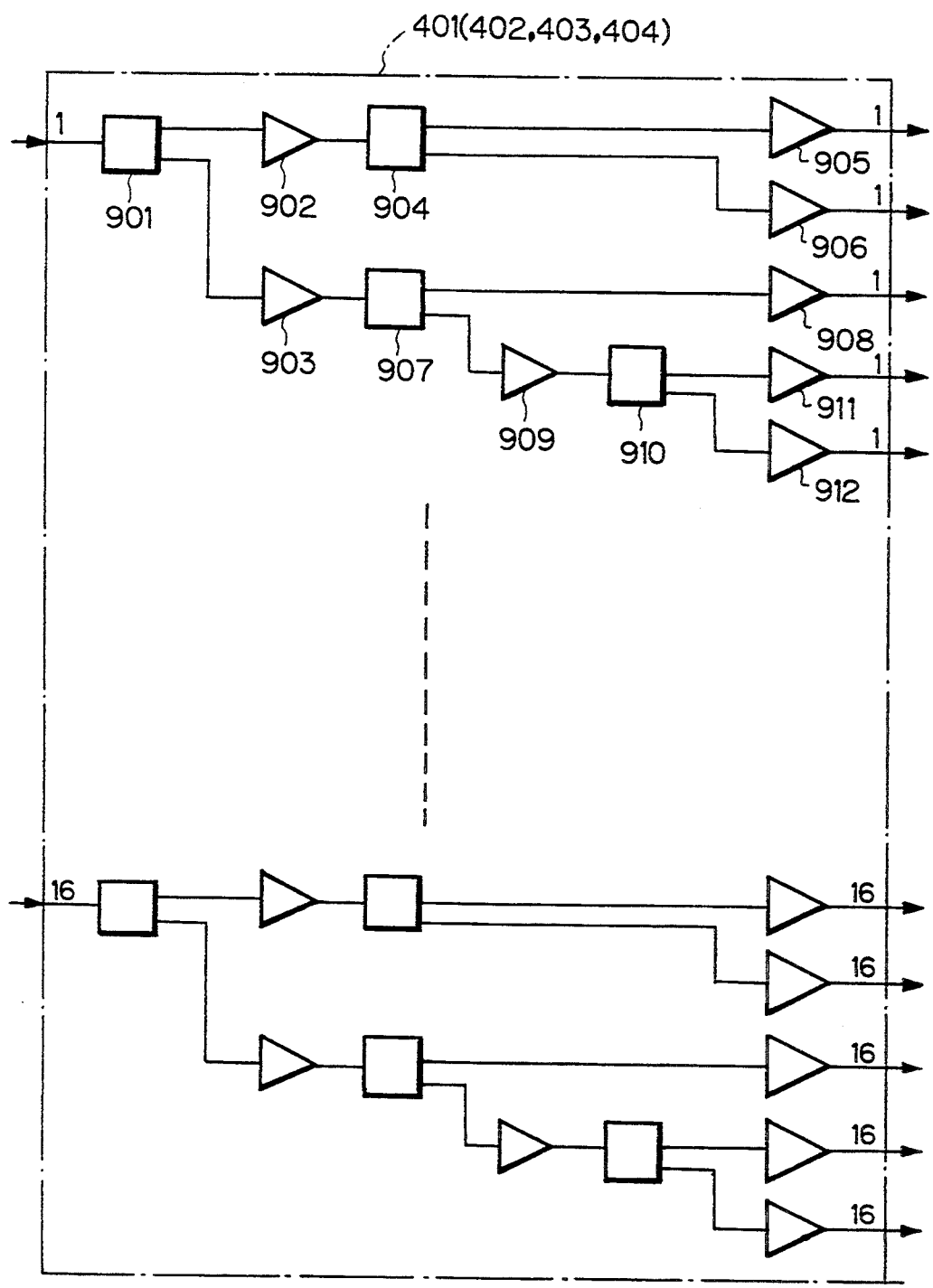
FIG. 9 is a detailed circuit diagram of the input portion of FIG. 8.

In FIG. 9, which is a detailed circuit diagram of the optical input portion 401 (402, 403, 404) of FIG. 8, each link is formed by a waveguide splitter 901, two laser amplifiers 902 and 903 for amplifying the output light of the waveguide splitter 901, a waveguide splitter 904 for splitting the output light of the laser amplifier 902, two laser amplifiers 905 and 906 for amplifying the output light of the waveguide splitter 904, a waveguide splitter 907 for splitting the output light of the laser amplifier 903, two laser amplifiers 908 and 909 for amplifying the output light of the waveguide splitter 907, a waveguide splitter 910 for splitting the output light of the laser amplifier 909, and two laser amplifiers 911 and 912 for amplifying the output light of the waveguide splitter 910. Thus, each of the sixteen links are divided into five sublinks.

Figure 10:
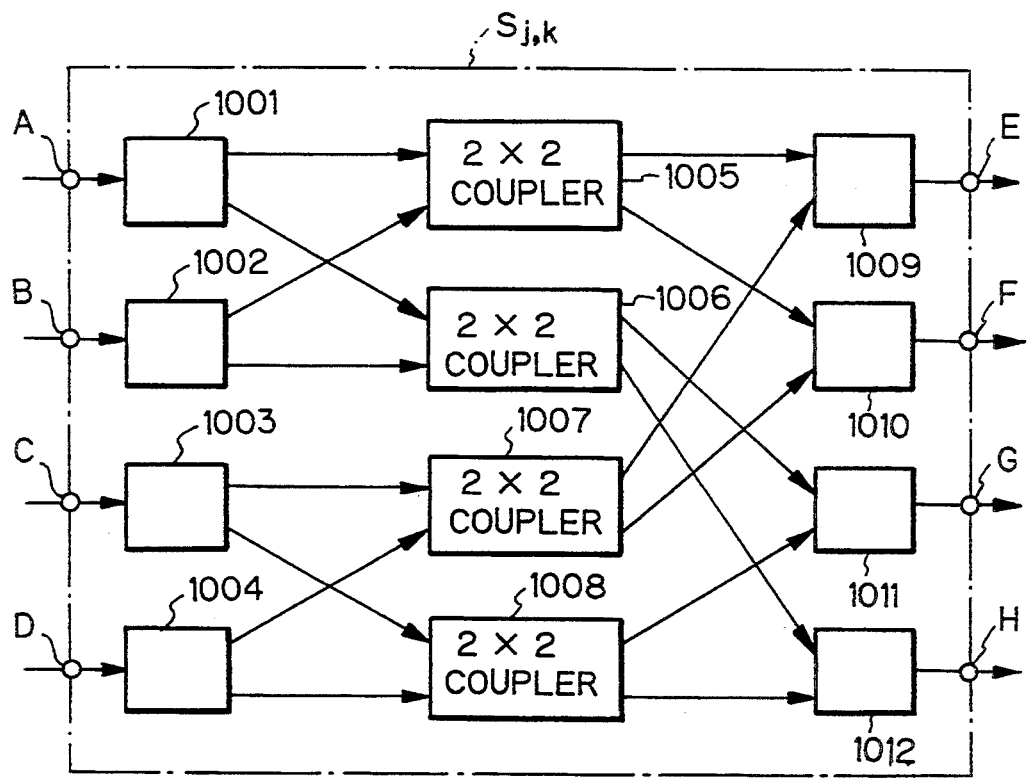
FIG. 10 is a detailed circuit diagram of the 4×4 switch of FIG. 8.
Figure 11:
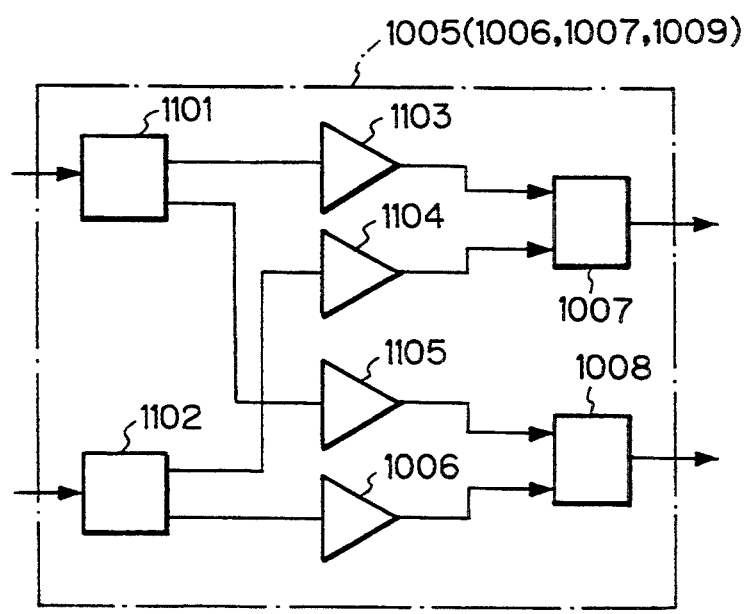
FIG. 11 is a detailed circuit diagram of the directional coupler of FIG. 10.

In FIG. 10, which is a detailed circuit diagram of the optical switch $S_{j,k}$ of FIG. 8, four ON-OFF waveguide switches 1001, 1002, 1003 and 1004 each having a waveguide splitter, four 2×2 directional couplers 1005, 1006, 1007 and 1008, and four ON-OFF waveguide ON-OFF switches 1009, 1010, 1011 and 1012 each having a waveguide combiner, are shown. As illustrated in FIG. 11, each of the 2×2 directional couplers 1005, 1006, 1007 and 1008 is formed by two waveguide splitters 1101 and 1102, four laser amplifiers 1103, 1104, 1105 and 1106, and two waveguide combiners 1107 and 1108. For example, if the ON-OFF switch 1001 is turned ON and the ON-OFF switches 1002, 1003 and 1004 are turned OFF, and the ON-OFF switch 1009 is turned ON and the ON-OFF switches 1010, 1011 and 1012 are turned OFF, the input port A is connected to the output port E.

Figure 12:
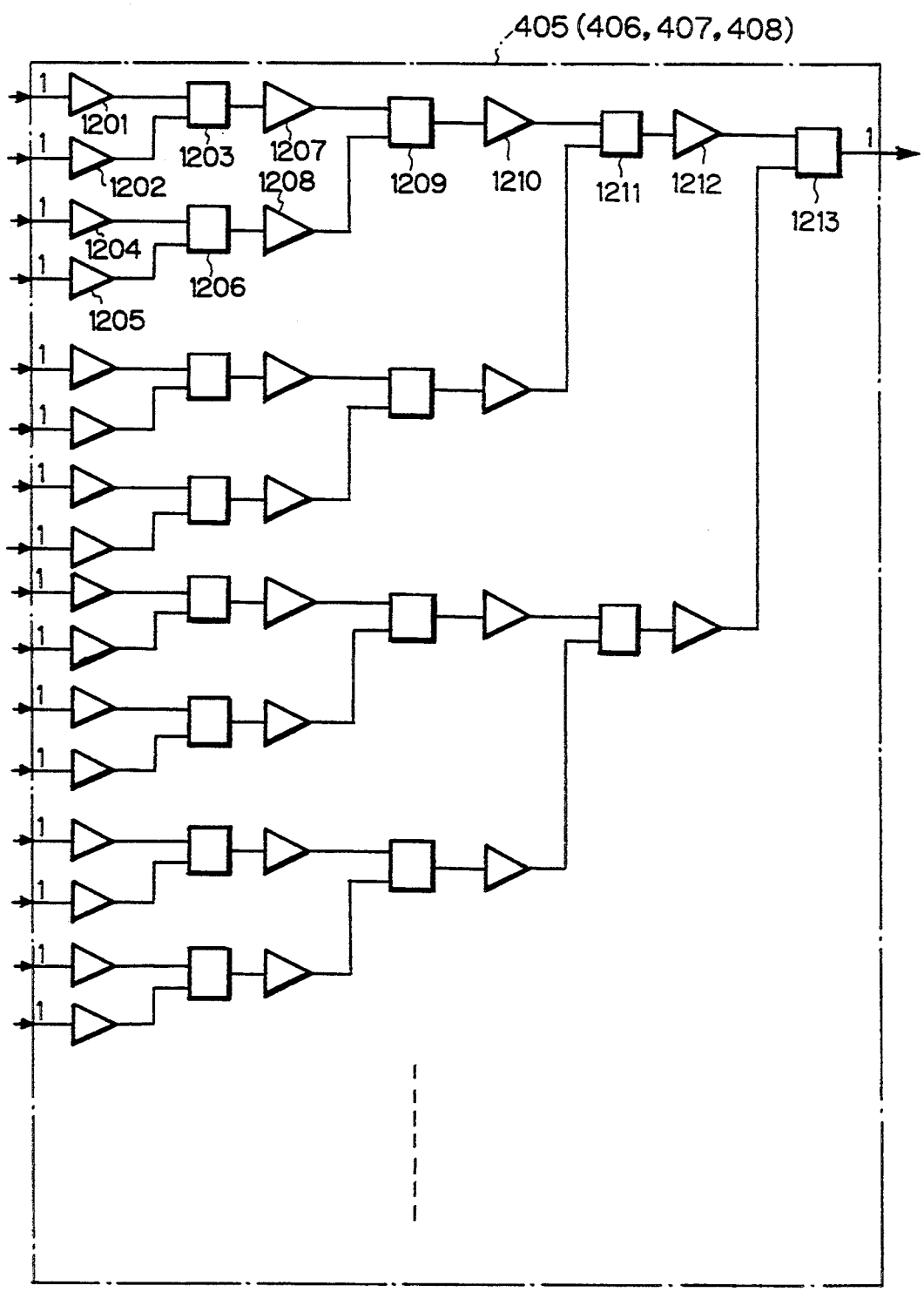
FIG. 12 is a detailed circuit diagram of the output portion of FIG. 8.

In FIG. 12, which is a detailed circuit diagram of the optical output portion 405 (406, 407, 408) of FIG. 8, each link is formed by two laser amplifiers 1201 and 1202 for amplifying the output lights of two sublinks from the optical switches, a waveguide combiner 1203 for combining the output lights of the laser amplifiers 1201 and 1202, two laser amplifiers 1204 and 1205 for amplifying the output lights of two sublinks from the optical switches, a waveguide combiner 1206 for combining the output lights of the laser amplifiers 1204 and 1205, two laser amplifiers 1207 and 1208 for amplifying the output lights of the waveguide combiners 1203 and 1206, a waveguide combiner 1209 for combining the output lights of the laser amplifiers 1207 and 1208, and a laser amplifier 1210 for amplifying the output light of the combiner 1209. Also, each link includes a waveguide combiner 1211 for combining the output lights of four sublinks from the laser amplifier 1210 with the output lights of other four sublinks from the optical switches, and a laser amplifier 1212 for amplifying the output light of the waveguide combiner 1211. Further, each link includes a waveguide combiner 1213 for combining the output lights of eight sublinks from the laser amplifier 1212 with the output lights of other eight sublinks from the optical switches. Thus, every sixteen sublinks are combined into one link.

Note that the optical switching network 4 as illustrated in FIGS. 8, 9, 10, 11 and 12 is uni-directional. However, a configuration similar to that illustrated in FIG. 8 is added to the elements thereof, to easily obtain a bidirectional switching network. Thus, for simplicity of illustration, only a uni-directional configuration is illustrated in FIG. 8.

Next, in order to change the shape and size of the coverage areas A, B, C and D for the mobile base stations 2-A, 2-B, 2-C and 2-D, respectively, the operation of the control circuit 1a is explained below with reference to FIGS. 13 and 14.

Figure 13:
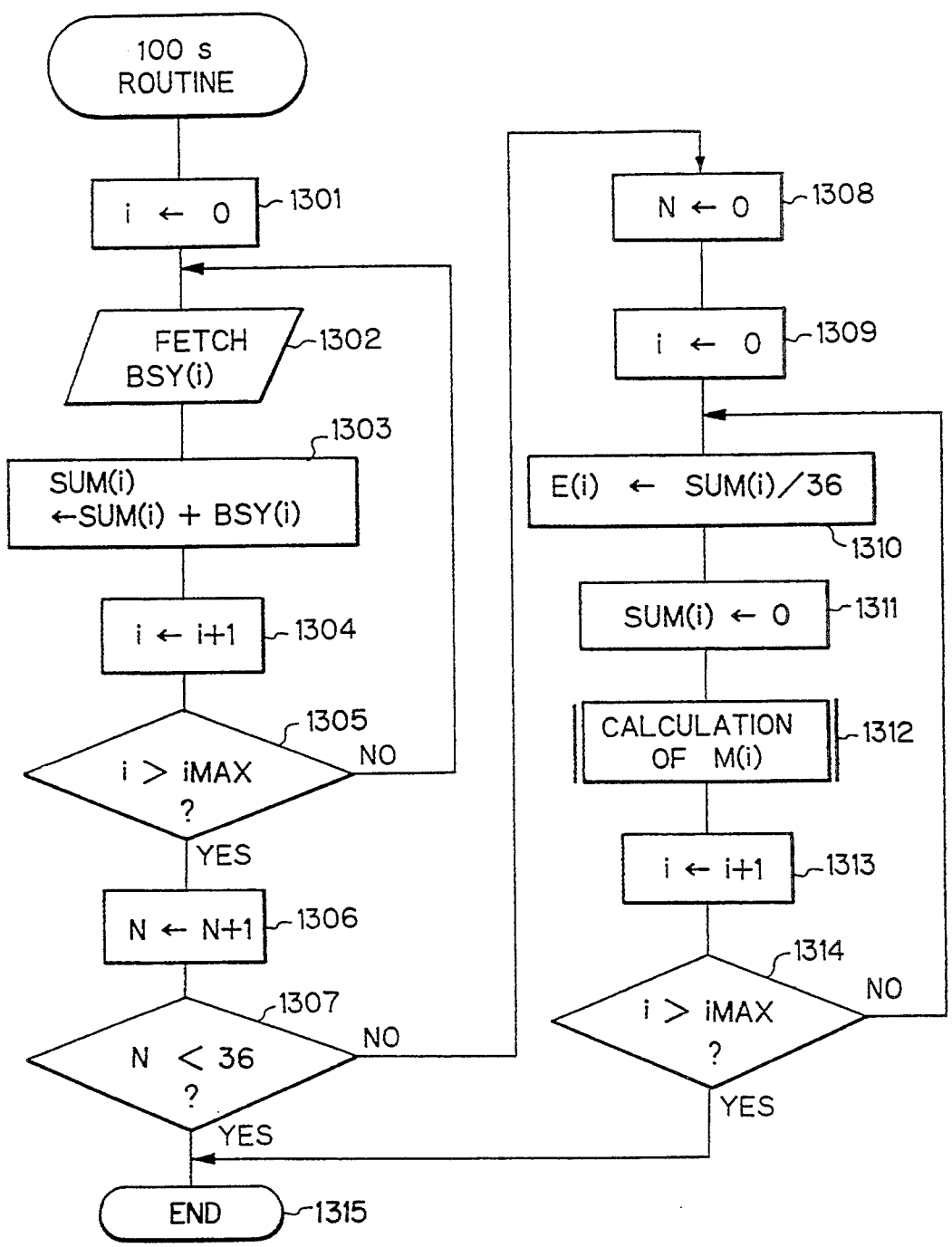
FIGS. 13 and 14 are flowcharts showing the operation of the control circuit of the mobile control station of FIG. 4.
Figures 14, 15:
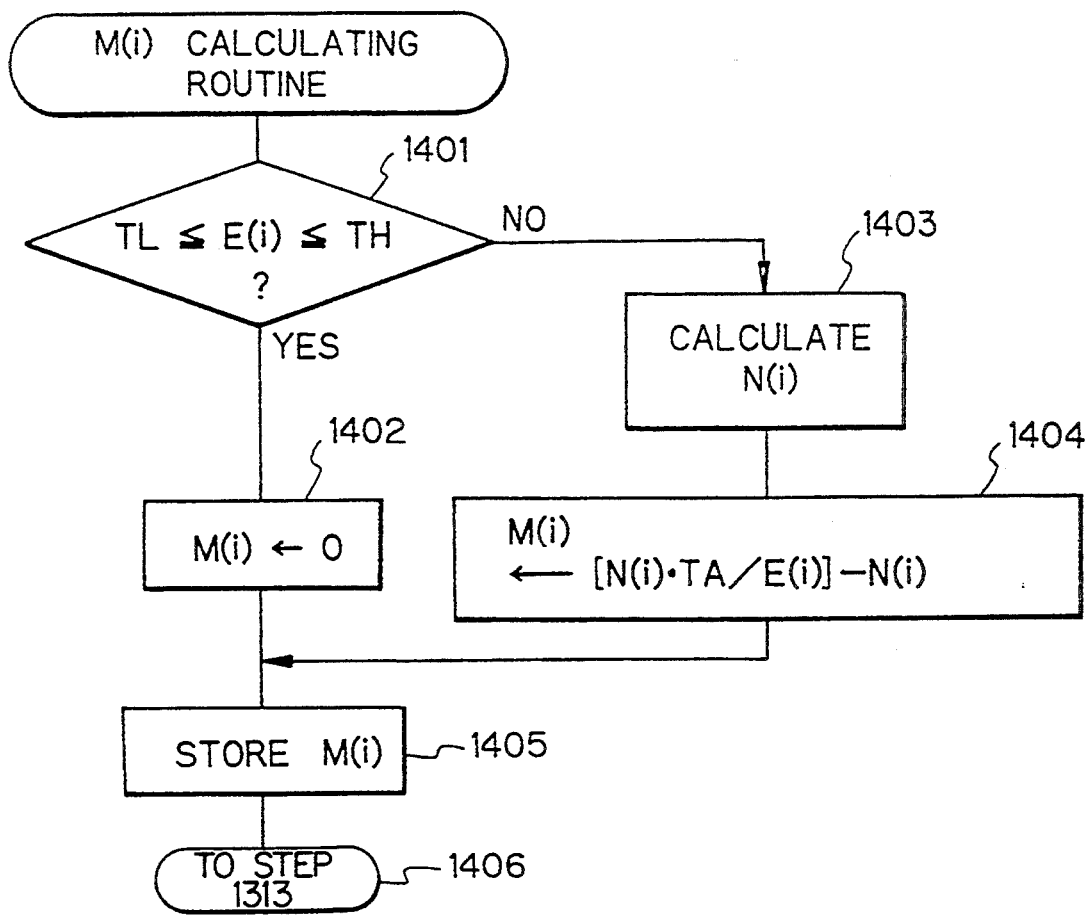
FIG. 15 is a diagram showing the values of M(i) calculated in the flowchart of FIG. 14.

The flowchart of FIG. 13 is used for calculating an amount of traffic channels or mobile stations being serviced for each of the coverage areas A, B, C and D, i.e., the mobile base stations 2-A, 2-B, 2-C and 2-D; and the flowchart of FIG. 14 is used for calculating a number of adjustable antenna units for each of the coverage areas A, B, C and D, i.e., an increased number of antenna units to be connected to each of the mobile base stations 2-A, 2-B, 2-C and 2-D or a decreased number of antenna units to be disconnected from each of the mobile base stations 2-A, 2-B, 2-C and 2-D.

In FIG. 13, which is carried out at a predetermined time such as 100 s, at step 1301, a counter i is cleared. Note that i=0 corresponds to the coverage area A, i.e., the mobile base station 2-A; i=1 corresponds to the coverage area B, i.e., the mobile base station 2-B; i=2 corresponds to the coverage area C, i.e., the mobile base station 2-C; and i=3 corresponds to the coverage area D, i.e., the mobile base station 2-D.

At step 1302, a current number BSY(i) of traffic channels for the coverage area i is fetched from the traffic observation function unit (not shown) in the control unit 1a. Then, at step 1303, a value of SUM(i) is incremented by BSY(i). That is, the value of SUM(i) is an accumulated value of BSY(i). The control at steps 1302 and 1303 is repeated four times by steps 1304 and 1305. Note that a value iMAX at step 1305 is, in this case, 4.

At step 1306, a counter N is incremented by +1, and at step 1307, it is determined whether or not the value of the counter N has reached 36. Only when N≧36, does the control proceed to step 1308. Otherwise, the control proceeds to step 1315, thus completing the routine of FIG. 13.

Thus, the control at steps 1301 through 1305 is repeated 36 times by steps 1306 and 1307. As a result, each value SUM(i) (i=0~3) represents a number of traffic channels per one hour (=100 s×36) for each coverage area i.

Next, steps 1308 through 1314 are explained.

As explained above, every time the value of the counter N reaches 36, i.e., every one hour, the control at step 1307 proceeds to step 1308.

At step 1308, the counter N is cleared, and at step 1309, the counter i is cleared.

At step 1310, a number E(i) of traffic channels is calculated by $$E(i) \leftarrow SUM(i)/36$$

That is, the value E(i) represents a mean value of the number of traffic channels per one minute. Then, at step 1311, the value SUM(i) is cleared for the preparation of the next execution.

At step 1312, an adjustable number M(i) of antenna units to be connected to or disconnected from the coverage area i is calculated in accordance with the mean value E(i), which will be explained later with reference to FIG. 14.

The control at steps 1310, 1311 and 1312 is repeated four times by steps 1313 and 1314. That is, the calculation of the adjustable number M(i) is calculated for every coverage area. Then, the control proceeds to step 1315, thus completing the routine of FIG. 13.

Referring to FIG. 14, at step 1401, it is determined whether or not the mean number E(i) is within a range from TL to TH, where TL is a low threshold number of traffic channels; and
TH is a high threshold number of traffic channels.

That is, when the mean number E(i) is smaller than the low threshold number TL, the coverage area i is determined to be unified to other adjacent coverage areas; while when the mean number E(i) is larger than the high threshold number TH, the coverage area i is determined to be divided into smaller coverage areas. As a result, if E(i) satisfies TL≦E(i)≦TH, the control proceeds to step 1402 in which the adjustable number M(i) of antenna units is made 0. Otherwise, the control proceeds to steps 1403 and 1404.

At step 1403, a current number N(i) of antenna units connected to the coverage area i, i.e., the mobile base station i, is calculated in accordance with the table stored in the memory (not shown) of the control unit 1a, as shown in FIG. 16. Then, at step 1404, the adjustable number M(i) of antenna units is calculated by $$M(i) \leftarrow [N(i) \cdot TA/E(i)] - N(i)$$

where TA is an intermediate value between the low threshold number TL and the high threshold number TH, and corresponds to an optimum value of the mean value of traffic channels, and a notation [] represents a value obtained by rounding down the value within the parentheses at the radix point. Note that $$[N(i) \cdot TA/E(i)] - N(i)$$

$$[N(i) \cdot (TA/E(i))][E(i)]N(i)$$

Then, at step 1405, the adjustable number M(i) of antenna units is stored in the memory (not shown) of the control unit 1a. Thus, at step 1406, the control returns to step 1313 of FIG. 13.

Note that when the range defined by the numbers TL and TH is too narrow, the control may chatter, while when the range defined by the numbers TL and TH is too broad, the mean number of traffic channels may be too large or too small, which invites a local congestion state.

For example, the adjustable number M(i) of antenna units is shown in a left column of FIG. 15. That is, the number of antenna units for the coverage area A should be decreased by 6, and the number of antenna units for the coverage area B should be increased by 10. No change in the number of antenna units is required for the coverage areas C and D. However, it should be noted that the total adjustable number of antenna units for all of the coverage areas A, B, C and D should be zero, since the number of antenna units in the service area defined by the mobile control station 1 is constant. Therefore, the adjustable number M(i) is modified as in the right column of FIG. 15. In this case, the number of antenna units for the coverage area A should be decreased by 5; the number of antenna units for the coverage area B should be increased by 8; the number of antenna units for the coverage area C should be increased by 1; and the number of antenna units for the coverage unit D should be decreased by A (see FIGS. 6A and 6B).

Here, assume that the state of the coverage areas A, B, C and D is as shown in FIG. 6A. In this case, the connection state of antenna units is shown in the "BEFORE ADJUSTMENT" column of FIG. 16. After the adjustable number M(i) of antenna units for the coverage areas A, B, C and D is calculated and modified as shown in FIG. 15, an example of the connection state of antenna units is shown in the "AFTER ADJUSTMENT" column of FIG. 16. In this case, the control unit 1a recognizes differences between the "BEFORE ADJUSTMENT" column and the "AFTER ADJUSTMENT" column of FIG. 16, and as a result, the control unit 1a generates OFF commands and ON commands sequentially and transmits them to the 4×4 optical switches $S_{1,1}$ through $S_{16,5}$ of the optical switching network 4, which is explained in more detail with reference to FIG. 16 and FIGS. 17A through 17K.

An initial connection state of the antenna units is shown in FIG. 17A corresponding to FIG. 6A. In this state, in order to switch the antenna unit E3 from the coverage area A to the coverage area B, the control unit 1a generates an OFF command and transmits it to the ON-OFF waveguide switches 1001 and 1009 (ports A and E) of the optical switch $S_{3,3}$, and thereafter generates an ON command and transmits it to the ON-OFF waveguide switches 1002 and 1009 (ports B and E) of the optical switch $S_{5,3}$. Thus, the connection state of the antenna units as shown in FIG. 17B is obtained. Next, in order to switch the antenna unit F3 from the coverage area A to the coverage area B, the control unit 1a generates an OFF command and transmits it to the ON-OFF waveguide switches 1001 and 1010 (ports A and F) of the optical switch $S_{6,3}$, and thereafter generates an ON command and transmits it to the ON-OFF waveguide switches 1002 and 1010 (ports B and F) of the optical switch $S_{6,3}$. Thus, the connection state of the antenna units as shown in FIG. 17C is obtained. Next, in order to switch the antenna unit G1 from the coverage area A to the coverage area C, the control unit 1a generates an OFF command and transmits it to the ON-OFF waveguide switches 1001 and 1011 (ports A and G) of the optical switch $S_{7,1}$, and thereafter generates an ON command and transmits it to the ON-OFF waveguide switches 1003 and 1011 (ports C and G) of the optical switch $S_{4,1}$. Thus, the connection state of the antenna units as shown in FIG. 17D is obtained. Next, in order to switch the antenna unit G3 from the coverage area A to the coverage area C, the control unit 1a generates an OFF command and transmits it to the ON-OFF waveguide switches 1001 and 1011 (ports A and G) of the optical switch $S_{8,2}$, and thereafter generates an ON command and transmits it to the ON-OFF waveguide switches 1003 and 1011 (ports C and G) of the optical switch $S_{5,2}$. Thus, the connection state of the antenna units as shown in FIG. 17E is obtained. Next, in order to switch the antenna unit G3 from the coverage area A to the coverage area B, the control unit 1a generates an OFF command and transmits it to the ON-OFF waveguide switches 1001 and 1011 (ports A and G) of the optical switch $S_{9,3}$, and thereafter generates an ON command and transmits it to the ON-OFF waveguide switches 1002 and 1011 (ports B and G) of the optical switch $S_{7,3}$. Thus, the connection state of the antenna units as shown in FIG. 17F is obtained. Next, in order to switch the antenna unit G4 from the coverage area D to the coverage area B, the control unit 1a generates an OFF command and transmits it to the ON-OFF waveguide switches 1004 and 1011 (ports D and G) of the optical switch $S_{1,4}$, and thereafter generates an ON command and transmits it to the ON-OFF waveguide switches 1002 and 1011 (ports B and G) of the optical switch $S_{8,4}$. Thus, the connection state of the antenna units as shown in FIG. 17G is obtained. Next, in order to switch the antenna unit G5 from the coverage area D to the coverage area B, the control unit 1a generates an OFF command and transmits it to the ON-OFF waveguide switches 1004 and 1011 (ports D and G) of the optical switch $S_{2,5}$, and thereafter generates an ON command and transmits it to the ON-OFF waveguide switches 1002 and 1011 (ports B and G) of the optical switch $S_{9,5}$. Thus, the connection state of the antenna units as shown in FIG. 17H is obtained Next, in order to switch the antenna unit H3 from the coverage area A to the coverage area B, the control unit 1a generates an OFF command and transmits it to the ON-OFF waveguide switches 1003 and 1012 (ports C and H) of the optical switch $S_{3,3}$, and thereafter generates an ON command and transmits it to the ON-OFF waveguide switches 1002 and 1012 (ports B and H) of the optical switch $S_{10,3}$. Thus the connection state of the antenna units as shown in FIG. 17I is obtained Next, in order to switch the antenna unit H4 from the coverage area D to the coverage area B, the control unit 1a generates an OFF command and transmits it to the ON-OFF waveguide switches 1004 and 1012 (ports D and H) of the optical switch $S_{3,4}$, and thereafter generates an ON command and transmits it to the ON-OFF waveguide switches 1002 and 1012 (ports B and H) of the optical switch $S_{11,4}$. Thus, the connection state of the antenna units as shown in FIG. 17J is obtained. Finally in order to switch the antenna unit H5 from the coverage area D to the coverage area B, the control unit 1a generates an OFF command and transmits it to the ON-OFF waveguide switches 1004 and 1012 (ports D and H) of the optical switch $S_{4,5}$, and thereafter generates an ON command and transmits it to the ON-OFF waveguide switches 1002 and 1012 (ports B and H) of the optical switch $S_{12,5}$. Thus, the connection state of the antenna units as shown in FIG. 17K corresponding to FIG. 6B is obtained.

Figure 18:
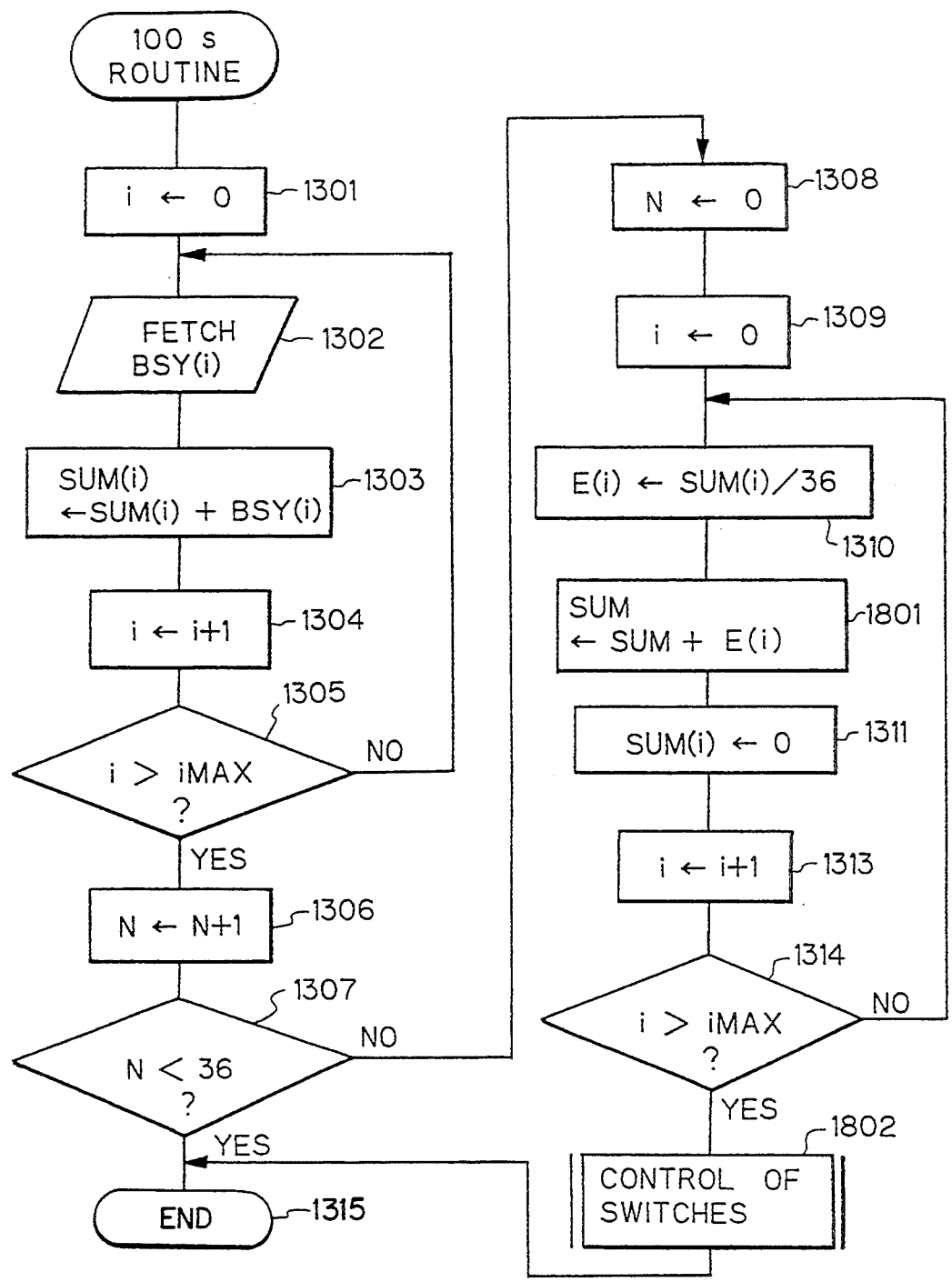
FIGS. 18 and 19 are flowcharts showing the operation of the control circuit of the mobile control station of FIG. 4.

In FIG. 18, which is a modification of FIG. 13, step 1312 is deleted, and steps 1801 and 1802 are added, thereby to estimate an increased number of antenna units to be connected to each of the mobile base stations or a decreased number of antenna units to be disconnected from each of the mobile base stations. That is, by repeating step 1801 four times, the mean value E(i) of the number of traffic channels per one minute is accumulated to obtain a total number SUM of traffic channels per one minute for all of the coverage areas i. Also, every time the total number SUM of traffic channels is obtained, the control proceeds to step 1802 which controls the optical switches, which will now be explained with reference to FIG. 19.

Figure 19:
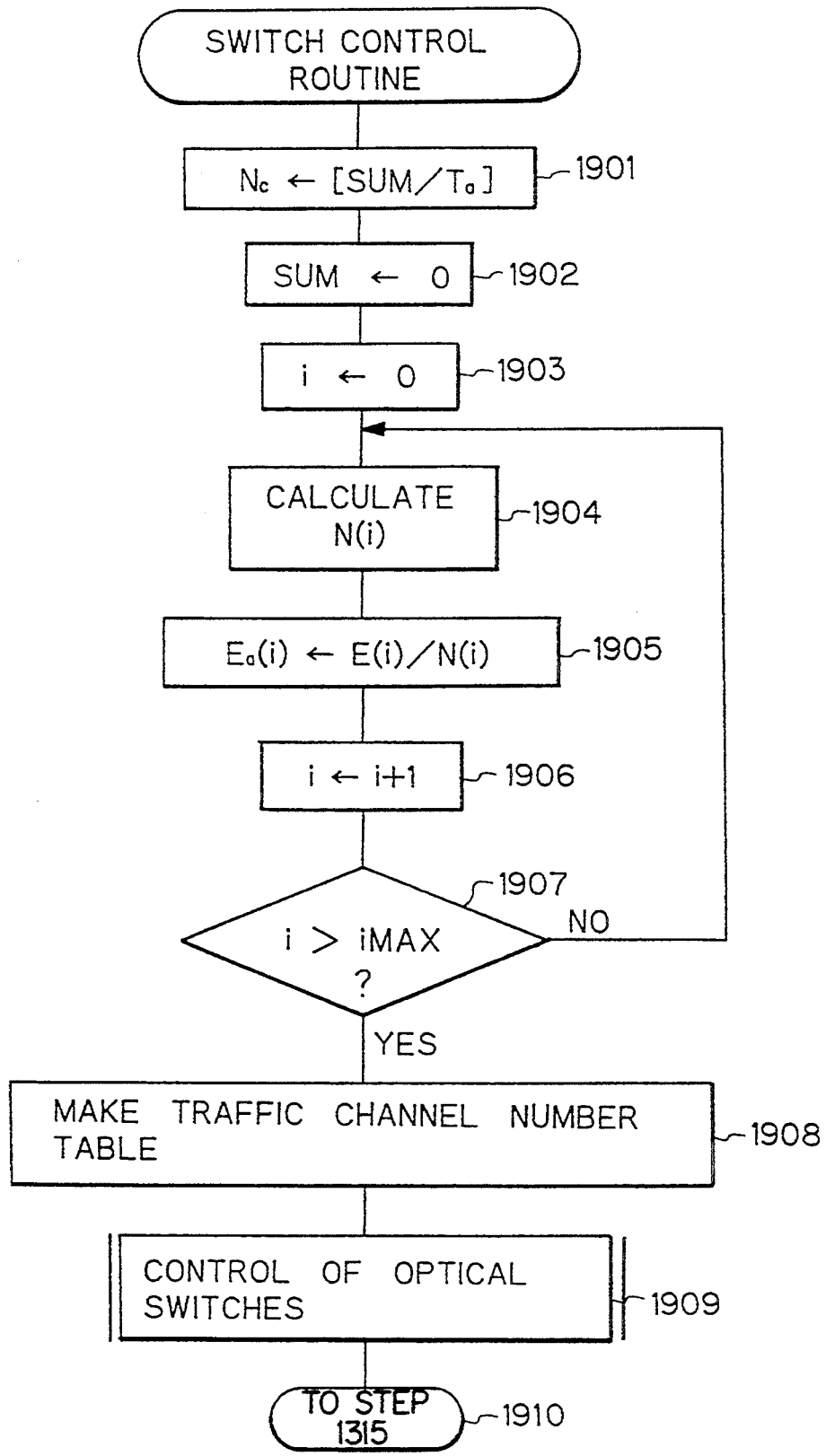

Referring to FIG. 19, at step 1901, an aimed number Nc of coverage areas is calculated by Nc←[SUM/Ta]

where Ta is a target number of traffic channels per one coverage areas, which is, for example, 100. That is, the number of coverage areas can be variable; in this case, this number can be 1, 2, 3 or 4. Then, at step 1902, the value SUM is cleared for the preparation of the next operation.

Steps 1904 and 1905 are repeated four times by steps 1903, 1906 and 1907 where the value iMAX is 4. That is, at step 1904, a current number N(i) of antenna units connected to the coverage area i, i.e., the mobile base station i, is calculated in accordance with the table stored in the memory (not shown) of the control unit 1a, as shown in FIG. 20. Then, at step 1904, a number Ea (i) of traffic channels per one antenna unit for each coverage area i is calculated by Ea(i)←E(i)/N(i)

where the mean value E(i) of traffic channels for each coverage area i is already calculated by step 1310 of FIG. 18, as indicated in FIG. 20.

At step 1908, a table of numbers of traffic channels for each antenna unit is made by using the values Ea(i), as shown in FIG. 21A which corresponds to the connection state of the antenna units to the coverage areas A, B, C and D as shown in FIG. 21B. Also, at step 1908, an adjustment is made to the table of FIG. 21A, so that the mean value E(i) of traffic channels for each coverage area is brought close to the target number Ta such as 100, as shown in FIG. 22A which corresponds to the correction state of the antenna units to the coverage areas A, B, C and D as shown in FIG. 22B. In this case, note that the transfer of the antenna units between the coverage areas is carried out at the border of the coverage areas.

Then, at step 1909, the optical switches are controlled in accordance with the difference between BEFORE ADJUSTMENT TABLE as shown in FIG. 21A and the AFTER ADJUSTMENT TABLE as shown in FIG. 22A. That is, the antenna unit E3 is switched from the coverage area A to the coverage area B; the antenna unit F3 is switched from the coverage area A to the coverage area B; the antenna unit G3 is switched from the coverage area C to the coverage area D; and the antenna unit H3 is switched from the coverage area C to the coverage: area D. In this case, the control unit 1a generates OFF commands and ON commands and transmits them to the ON-OFF waveguide switches, in the same way as in FIGS. 17A through 17K.

Then, the control proceeds to step 1910, thereby returning to step 1315 of FIG. 18.

As explained hereinbefore, according to the present invention, since the shape and/or size of the coverage areas are changed in accordance with the amount of traffic channels thereof, the quality of communication between the mobile control station and the mobile stations can be improved, and also, the generation of a local congestion state within each of the coverage areas can be avoided.

I claim:

1. A mobile communication system comprising:
    a plurality of antennas located in different sites;
    a mobile control station for controlling a service area defined by said antennas;
    a plurality of mobile base stations, connected to said mobile control station, said mobile control station dividing the service area into a plurality of coverage areas;
    means for connecting one or more of said antennas to each of said mobile base stations to define the corresponding coverage areas thereof;
    means, connected to said mobile control station, for calculating a number of said antennas connected to each of said mobile base stations;
    means, connected to said mobile control station, for calculating a number of mobile stations being serviced within each of the coverage areas; and
    means, connected to said mobile control station, for changing the number of said antennas connected to each of said mobile base stations in accordance with a calculated number of mobile stations being serviced within the corresponding coverage areas.

2. A system as set forth in claim 1, wherein said changing means changes the number of said antennas connected to each of said mobile base stations so that the calculated number of mobile stations being serviced within each of the coverage areas is brought within a range defined by a minimum value (TL) and a maximum value (TH) having a center value (TA) therebetween.

3. A system as set forth in claim 2, wherein said changing means increases the number of said antennas connected to one of said mobile base stations when the calculated number of mobile stations being serviced for the one of said mobile base stations is smaller than the minimum value, said changing means decreasing the number of said antennas connected to one of said mobile base stations when the calculated number of mobile stations being serviced for the one of said mobile base stations is larger than the maximum value.

4. A system as set forth in claim 2, wherein said changing means increases the number of said antennas connected to one of said mobile base stations in accordance with a difference between the calculated number of mobile stations being serviced within it and the center value whenever the calculated number of mobile stations being serviced for the one of said mobile base stations is smaller than the minimum value, said changing means decreasing the number of said antennas connected to one of said mobile base stations in accordance with the difference between the calculated number of mobile stations being serviced within it and the center value whenever the calculated number of mobile stations being serviced for the one of said mobile base stations is larger than the maximum value.

5. A system as set forth in claim 1, wherein said connecting means comprises:
    a plurality of signal distributing and mixing unit, each connected to one of said mobile base stations, for distributing an input therefrom to a plurality of outputs and mixing a plurality of inputs thereto into an output; and
    a switching network, connected to said signal distributing and mixing units and said antennas, for selecting one or more of said antennas and connecting them to each of said signal distributing and mixing units.

6. A system as set forth in claim 5, wherein said switching network comprises an optical switching network.

7. A system as set forth in claim 5, wherein said changing means controls said switching network.

8. A mobile communication system comprising:
    a plurality of antennas located at different sites;
    means for controlling a service area defined by said antennas;
    means, connected to said controlling means, for dividing the service area into a plurality of coverage areas;
    means for calculating a number of mobile stations being serviced within each of the coverage areas;
    an optical switching network connected between said means for dividing said service area and said antennas; and
    changing means for controlling connection states between said means for dividing said service area and said antennas of said optical switching network to change at least one of a shape and size of the coverage areas in accordance with a calculated number of mobile stations being serviced, wherein said changing means changes at least one of the shape and size of the coverage areas so that the calculated number of mobile stations being serviced within each of the coverage areas is brought within a range defined by a minimum value (TL) and a maximum value (TH) having a center value (TA) therebetween, and wherein said changing means increases the size of one of the coverage areas when the calculated number of mobile stations being serviced within it is smaller than the minimum value, said changing means decreasing the size of one of the coverage areas when the calculated number of mobile stations being serviced within its area is larger than the maximum value.

9. A mobile communication system comprising:

a plurality of antennas located at different sites;

means for controlling a service area defined by said antennas;

means, connected to said controlling means, for dividing the service area into a plurality of coverage areas;

means for calculating a number of mobile stations being serviced within each of the coverage areas;

an optical switching network connected between said means for dividing said service area and said antennas; and changing means for controlling connection states between said means for dividing said service area and said antennas of said optical switching network to change at least one of a shape and size of the coverage areas in accordance with a calculated number of mobile stations being serviced, wherein said changing means changes at least one of the shape and size of the coverage areas so that the calculated number of mobile stations being serviced within each of the coverage areas is brought within a range defined by a minimum value (TL) and a maximum value (TH) having a center value (TA) therebetween, and wherein said changing means increases the size of one of the coverage areas in accordance with a difference between the calculated number of mobile stations being serviced within said one of the coverage areas and the center value whenever the calculated number of mobile stations being serviced within said one of the coverage areas is smaller than the minimum value, said changing means decreasing the size of one of the coverage areas in accordance with the difference between the calculated number of mobile stations being serviced within said one of the coverage areas and the center value whenever the calculated number of mobile stations being serviced within said one of the coverage areas is larger than the maximum value.

* * * * *